United States Patent
Nallabothula et al.

(10) Patent No.: US 10,938,695 B2
(45) Date of Patent: Mar. 2, 2021

(54) DIAGNOSTIC AND RECOVERY SIGNALS FOR DISCONNECTED APPLICATIONS IN HOSTED SERVICE ENVIRONMENT

(71) Applicant: Microsoft Technology Licensing, LLC, Redmond, WA (US)

(72) Inventors: Kiran Nallabothula, Redmond, WA (US); Nagaraj Patil, Redmond, WA (US); Nagaraju Palla, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/589,961

(22) Filed: Oct. 1, 2019

(65) Prior Publication Data

US 2020/0036613 A1 Jan. 30, 2020

Related U.S. Application Data

(63) Continuation of application No. 15/283,524, filed on Oct. 3, 2016, now Pat. No. 10,476,768.

(51) Int. Cl.
*H04L 12/26* (2006.01)
*H04L 29/08* (2006.01)
*H04L 12/24* (2006.01)

(52) U.S. Cl.
CPC ...... *H04L 43/0811* (2013.01); *H04L 41/0681* (2013.01); *H04L 67/10* (2013.01);
(Continued)

(58) Field of Classification Search
None
See application file for complete search history.

(56) References Cited

U.S. PATENT DOCUMENTS

| | | | |
|---|---|---|---|
| 2006/0070077 A1* | 3/2006 | Erlandson | G06F 11/0775 718/104 |
| 2007/0043860 A1* | 2/2007 | Pabari | G06F 9/455 709/224 |

(Continued)

FOREIGN PATENT DOCUMENTS

| CN | 1434948 A | 8/2003 |
|---|---|---|
| CN | 103503018 A | 1/2014 |

(Continued)

OTHER PUBLICATIONS

"Office Action and Search Report Issued in Chinese Patent Application No. 201660018453.4", dated Mar. 24, 2020, 16 Pages.
(Continued)

*Primary Examiner* — James A Edwards
(74) *Attorney, Agent, or Firm* — Michael Best & Friedrich LLP

(57) ABSTRACT

An assistance service through its local client application or agent at a user's device (or devices) may collect diagnostic related information associated with the user's operating environment (physical and software operation parameters and configurations) and monitor a health of one or more applications. Upon detecting an issue or being activated by the user, the local client application or agent may perform diagnostic and/or recovery actions. In some cases, the diagnostic related signals may be sent directly by the application being monitored or diagnosed to its hosting service or the assistance service. Upon detecting a disconnect of the application being monitored or diagnosed, the local client application or agent may determine an alternative server and transmit the diagnostic related signals to the alternative server. An alert indicating the disconnect of the application may also be sent.

20 Claims, 7 Drawing Sheets

(52) U.S. Cl.
CPC ............ *H04L 41/069* (2013.01); *H04L 43/00* (2013.01); *H04L 43/16* (2013.01)

(56) References Cited

U.S. PATENT DOCUMENTS

2014/0359407 A1   12/2014  Demsey
2015/0134723 A1*  5/2015  Kansal ................ H04L 67/1031
                                                                        709/203

FOREIGN PATENT DOCUMENTS

CN        103503020 A    1/2014
CN        103516592 A    1/2014

OTHER PUBLICATIONS

"Office Action Issued in European Patent Application No. 16712178.9", dated Jan. 13, 2020, 6 Pages.

* cited by examiner

DIAGNOSTIC AND RECOVERY SIGNALS FOR DISCONNECTED APPLICATIONS IN HOSTED SERVICE ENVIRONMENT

RELATED APPLICATIONS

This application is a continuation of and claims priority to U.S. application Ser. No. 15/283,524, filed Oct. 3, 2016, the entire content of which is incorporated by reference herein.

BACKGROUND

Hosted services are increasingly providing valuable services to people in their home and work lives. Bringing applications such as word processing, spreadsheet, presentation, communication, notetaking, collaboration, and others under an umbrella, such services allow users to access, edit, and collaborate on documents through locally installed or cloud-accessible applications.

Hosted services and associated applications form a complex environment that involves local and cloud-stored data, device resources, user attributes, operating system and application configurations, among other things. Such services and their components are also subject to frequent updates and upgrades. Thus, they present a challenge to users when errors happen. Regular users may not be expected to diagnose and correct a majority of errors or crashes. A manual diagnostic and recovery process that involves expert help may also not be feasible or at least experience degrading when a service has a large number (e.g., hundreds of thousands) users.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to transmission of diagnostic and recovery signals for disconnected applications in hosted service environment. In some examples, while monitoring and collecting diagnostic related information associated with a user device and one or more servers executing a hosted service, a disconnect of an application associated with the hosted service may be detected from one or more servers executing the hosted service. An alternative server to which diagnostic related signals are to be sent may be determined. The diagnostic related signals may then be transmitted to the alternative server, where the alternative server is in a different cluster of servers at a datacenter from one or more servers configured to receive the diagnostic related signals.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
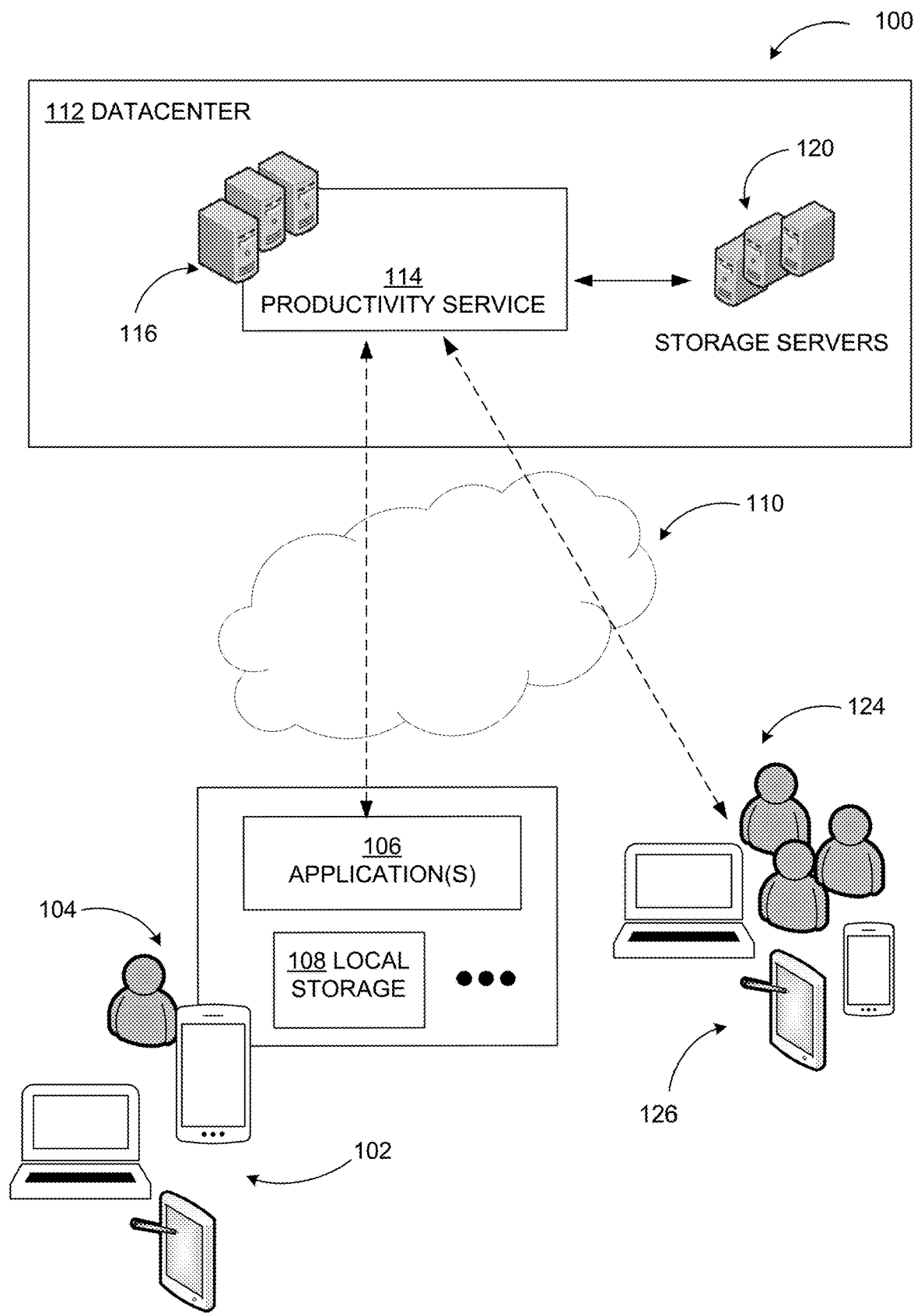
FIG. 1 includes an example system environment where diagnostic and recovery signals may be sent for disconnected applications in hosted service environment may be implemented.

As briefly described above, embodiments are directed to providing diagnostic and recovery signals for disconnected applications in hosted service environment. An assistance service through its local client application or agent at a user's device (or devices) may collect diagnostic related information associated with the user's operating environment (physical and software operation parameters and configurations) and monitor a health of one or more applications. Upon detecting an issue or being activated by the user, the local client application or agent may perform diagnostic and/or recovery actions. In some cases, the diagnostic related signals may be sent directly by the application being monitored or diagnosed to its hosting service or the assistance service. Upon detecting a disconnect of the application being monitored or diagnosed, the local client application or agent may determine an alternative server and transmit the diagnostic related signals to the alternative server. An alert indicating the disconnect of the application may also be sent.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing diagnostic and recovery signals for disconnected applications in hosted service environment. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example system environment where diagnostic and recovery signals may be sent for disconnected applications in hosted service environment may be implemented.

As illustrated in diagram 100, an example system may include a datacenter 112 hosting a productivity service 114 configured to provide a variety of productivity related applications and may be accessed across multiple devices and users. The datacenter 112 may include one or more processing servers 116 configured to execute the productivity service 114, among other components. In some embodiments, at least one of the processing servers 116 may be operable to manage the productivity service 114, where data from devices (such as devices 122, 126) may be stored with the cloud stored data at storage servers 120 (or associated data stores). As described herein, the productivity service 114 may be implemented as software, hardware, or combinations thereof.

In some embodiments, the productivity service 114 may be configured to interoperate with various applications to provide services such as word processing, spreadsheet processing, presentation, note taking, communications, scheduling, and comparable ones. For example, as illustrated in the diagram 100, a user 104 may execute a thin (e.g., a web browser) or a thick (e.g., a locally installed client application) version of an application 106 through the device 102 with which the productivity service 114 may be configured to integrate and interoperate with over one or more networks, such as network 110. The application 106 may be an application hosted by the productivity service, such as a word processing application, for example. The device 102 may include a desktop computer, a laptop computer, a tablet computer, a vehicle mount computer, a smart phone, or a wearable computing device, among other similar devices. A communication interface may facilitate communication between the productivity service 114 and the application 106 over the network 110.

In an example embodiment, the productivity service 114 may be configured to receive content from the application 106 of the device 102. The received content may be stored remotely at the productivity service 114 within the storage servers 120, for example. As the productivity service 114 includes a number of applications and involves a large number of local and remote resources, errors leading to application crashes or other undesirable results may occur. When a serious error like this occurs, users may have technical support help available. However, given the large number of users subscribing to modern hosted services, scheduling and coordinating technical support may degrade user experience and be expensive to provide for service providers. According to some embodiments, diagnostic and recovery signals may be sent for disconnected applications in hosted service environment by an assistance service or application that may be part of the productivity service 114 or a third party service.

Productivity service 114 is used as an illustrative example to describe various aspects of embodiments herein. However, embodiments are not limited to a productivity service. An assistance application or service providing diagnostic and recovery signals for disconnected applications in hosted service environment may be implemented with any hosted service such as a collaboration service, an online storage service, and others using the principles described herein.

A system according to embodiments allows exchange of diagnostic and recovery signals for disconnected applications in hosted service environment. By automatically and dynamically diagnosing system and application issues, performing recovery actions in conjunction with a support service, collecting statistical data, and performing notification tasks, increased efficiency, reduced local and cloud computing resource usage, reduced bandwidth usage, and increased security may be achieved.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users taking advantage of hosted services.

Figure 2:
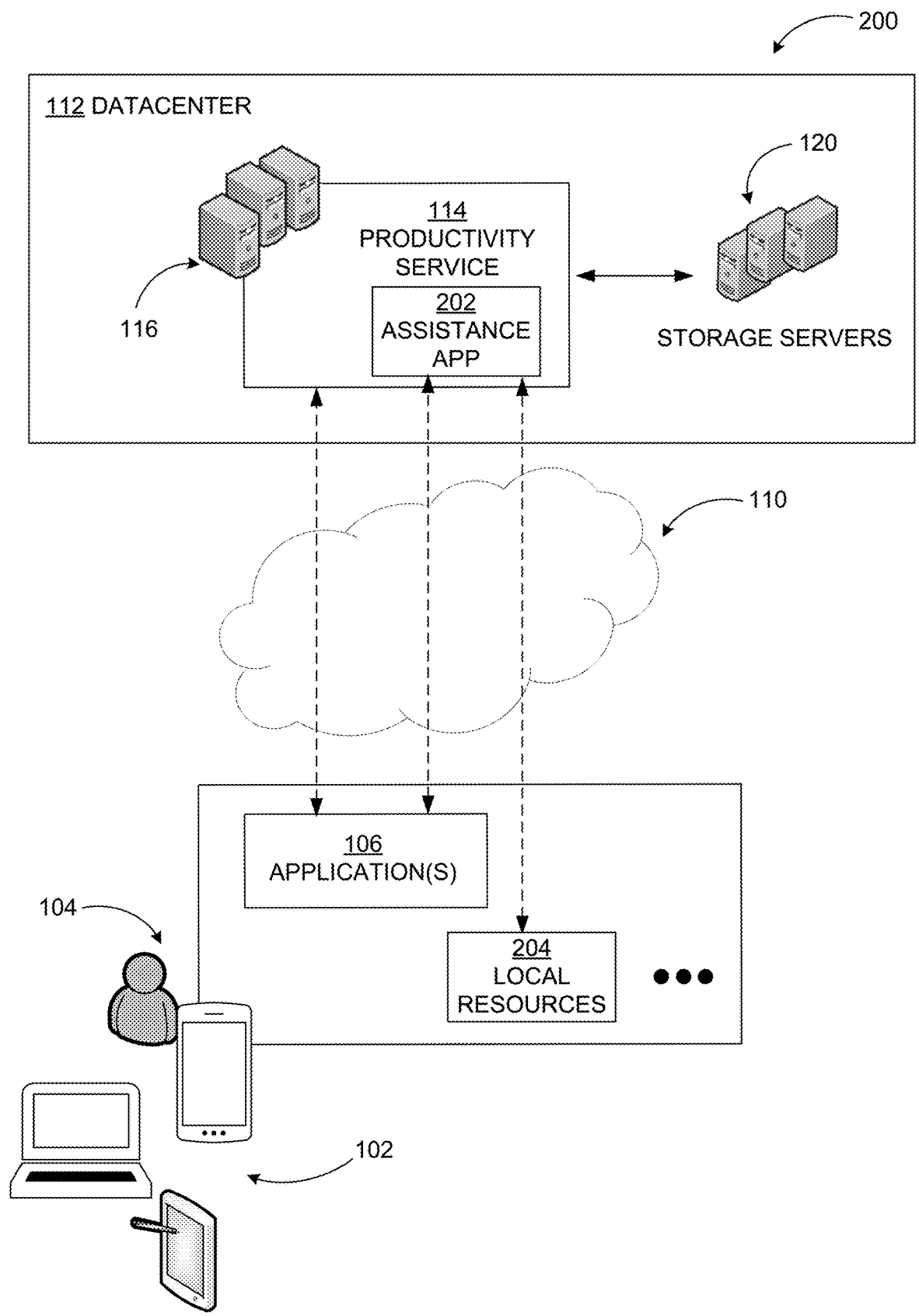
FIG. 2 illustrates conceptually diagnostic and recovery signal transmission for disconnected applications in hosted service environment.

FIG. 2 illustrates conceptually diagnostic and recovery signals for disconnected applications in hosted service environment.

As shown in diagram 200, diagnostic, recovery, and related actions for the productivity service 114 and its components may be performed by an assistance application 202 that is part of the productivity service 114. The assistance application 202 may be executed on one of the servers 116. In other embodiments, the assistance application 202 or one or more components may be executed on the local devices such as device 102. In further embodiments, the assistance application may be part of an independent assistance service executed on a separate server and provide personalized diagnostics, troubleshooting, recovery, and notification to multiple hosted services.

The assistance application may receive information from a number of sources (e.g., local resources 204). For example, system and device configuration information such as installed and/or running applications, memory availability, processor availability, network bandwidth, display characteristics, and other hardware and software state information may be received from operating systems, local and network task/system managers, other applications and/or services used by the user 104. Because user credentials determine what resources a user has access to and under which circumstances, user credentials may be retrieved from a credential manager or account manager agent. Telemetry data associated with past and current usage may be received from telemetry engines or similar data collectors. Because interactivity with other applications (within or outside the productivity service 114) may have an impact on the performance of individual applications, data from other applications may also be retrieved through standardized or custom application programming interfaces (APIs) on those applications.

In some embodiments, the assistance application 202 may continuously receive data and monitor conditions to identify error patterns. In other embodiments, the assistance application 202 may be activated by the user 104 upon encountering a problem and collect the data at activation to perform diagnostics. The assistance application 202 may analyze collected data and the encountered error, compare to known errors in a database, and determine possible solutions. The assistance application 202 may then apply the potential solutions (recovery actions) automatically. In some cases, the assistance application 202 may prompt the user 104 to take action such as sign off and sign in, or close certain applications, etc.

If a solution is found to address the encountered problem, the assistance application 202 may forward information associated with the encountered error, the identified solution, and state of hardware/software at the time of the error to a data insights database for analysis and updating of errors/solutions database. If a working solution is not identified, the assistance application 202 may escalate the issue to a support department of the productivity service 114 allowing support personnel to have all the background information and contact the user 104 without the user having to go through the process of calling the support department, describing the issue, etc.

In other embodiments, the assistance application 202 and/or its agent at the user device 102 may detect a service disconnect of application 106. In response to the detection, the assistance application may determine an alternative server to provide information to, and send diagnostic and recovery related signals to the alternative server.

Figure 3:
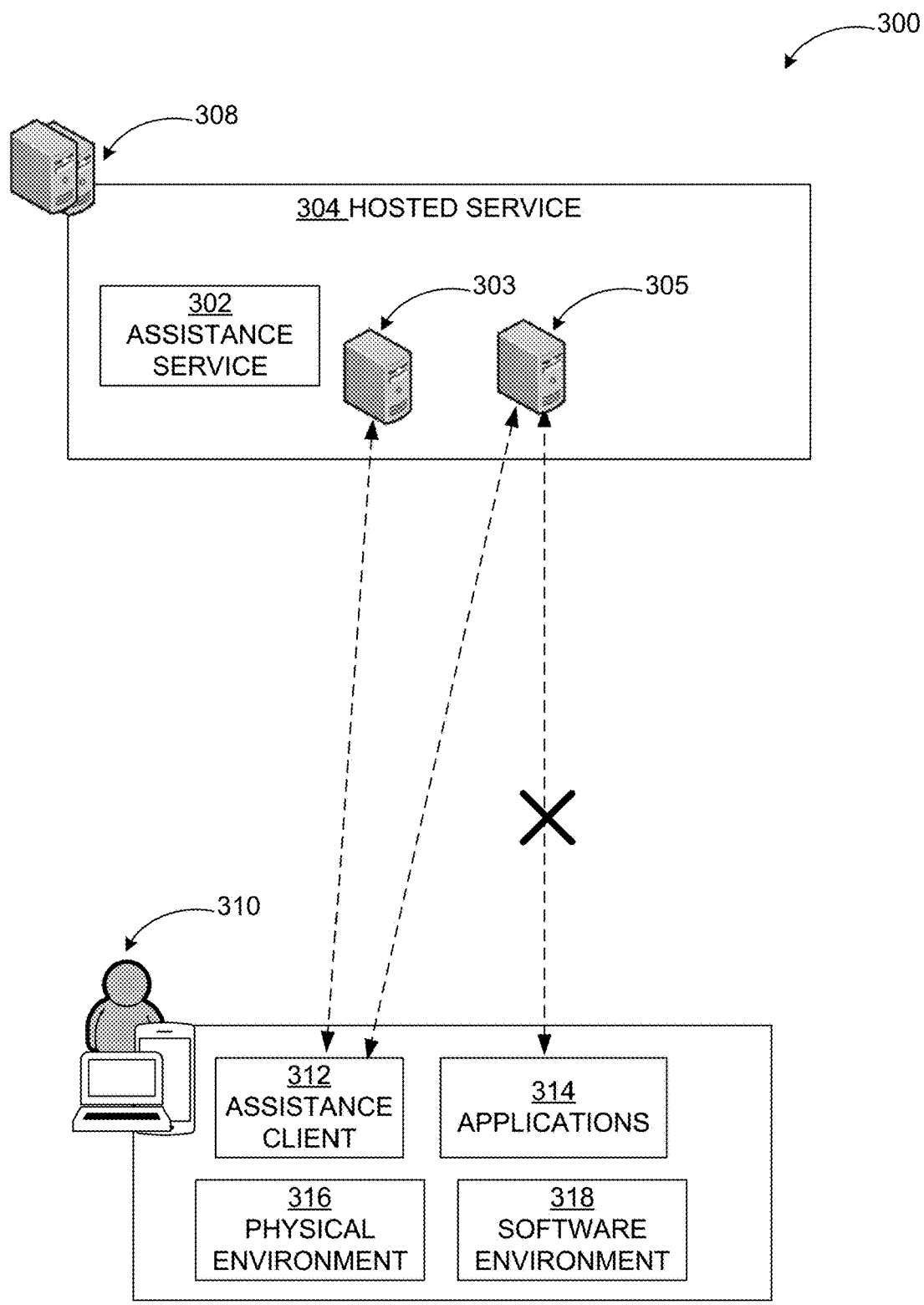
FIG. 3 illustrates example interactions between major components of a system for providing diagnostic and recovery signals for disconnected applications in hosted service environment.

FIG. 3 illustrates example interactions between major components of a system for providing diagnostic and recovery signals for disconnected applications in hosted service environment.

In diagram 300, example major components in providing diagnostic and recovery signals for disconnected applications in hosted service environment are shown. An assistance application or service according to embodiments may be implemented with additional or fewer components performing additional or fewer tasks than those described herein.

In the example configuration of diagram 300, an assistance service 302 may be executed on one or more servers such as server 308. A hosted service 304 such as a productivity service may also be executed on the same or different servers. The assistance service 302 may manage diagnostic, recovery, and related actions for subscribers of the productivity service 304 or other services. In a hosted service environment, users may access the functionality provided by the hosted service through locally installed (thick) client applications 314 or through web browsers (thin). Thus, issues arising with the functionality or applications of the hosted service may be cause by one or more hardware or software components at the user's client device or at the servers executing the hosted service. Therefore, a software environment and a physical environment of one or more servers may provide insight into resolving the issue(s). Software environment 318 and physical environment 316 at a device of the user 310 may also have an impact on the issue(s). Therefore, the assistance client 312 may collect information associated with both. The software environment 318 may include things such as a number and a type of applications 314 installed/executed on the user's client device, configurations of such applications, operating system type and version, states of various applications 314 being executed, and similar information. The physical environment 316 may include things such as available and used storage, memory, processor capacity, network connectivity, and comparable items.

In some embodiments, the assistance client 312 may transmit diagnostic related signals, that is, collected data, alerts, analysis results, and other comparable information to a server associated with the assistance service 302, a server associated with the hosted service 304 (e.g., productivity service), or other servers. In other examples, the assistance client 312 may cause the applications 314 to transmit diagnostic related signals too. For example, the applications 314 may transmit telemetry information associated with their operations and state to a server 305.

In some cases, the applications 314 may disconnect from the hosted service 304 or assistance service 302 due to a number of possible issues. Upon detecting the disconnect, the assistance client 312 may either take over transmission of the diagnostic related signals from applications 314 to server 305 or determine an alternative server 303 and transmit the diagnostic related signals to the server 303. The assistance client 312 may also send an alert indicating the disconnect of the applications 314.

Figure 4:
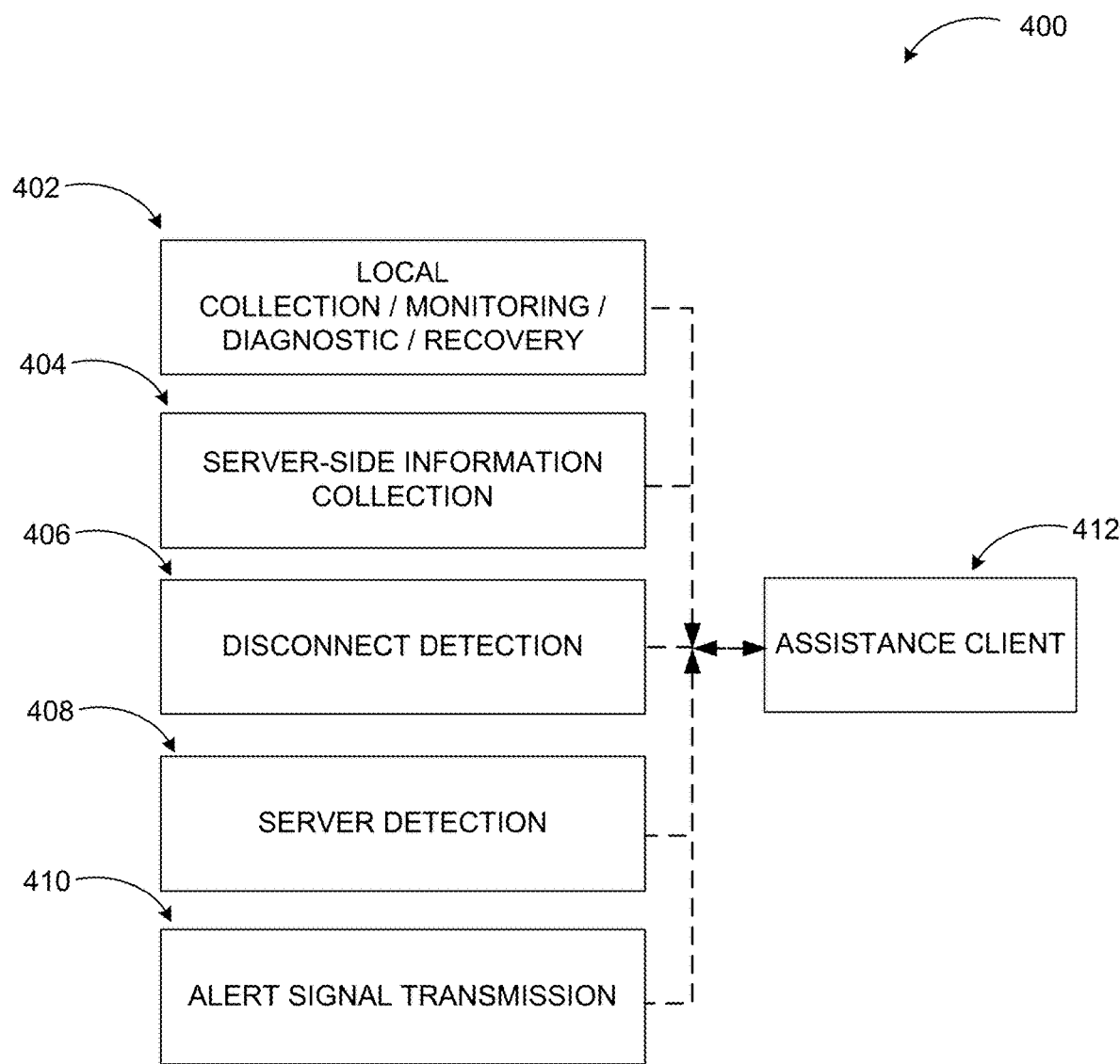
FIG. 4 illustrates example actions performed by components in providing diagnostic and recovery signals for disconnected applications in hosted service environment.

FIG. 4 illustrates example actions performed by components in providing diagnostic and recovery signals for disconnected applications in hosted service environment.

Diagram 400 shows some example actions that may be performed by an assistance client 412 on a user's computing device. As part of its automated diagnostic and recovery tasks, the assistance client 412 may collect and/or monitor software and hardware environment information on the user's computing device (402) as discussed above. In addition, the assistance client 412 may receive server-side software and hardware environment information 404 from the server(s) executing the hosted service whose issue is being diagnosed. The wide range of information collected and received in the above phases may be analyzed, tabulated, and correlated. The assistance service may also make inferences based on the collected information.

Upon detecting a disconnect of the application being monitored or diagnosed (406), the assistance client application or agent may determine an alternative server (408) and transmit the diagnostic related signals to the alternative server. An alert indicating the disconnect of the application may also be sent 410.

The alternative server may be part of a different cluster of machines at a datacenter and/or have a different scope. In some scenarios, the assistance service may monitor received diagnostic related signals and apply predefined and/or configurable rules. The rules may include one or more thresholds and the alert may be raised based on the one or more thresholds. For example, a disconnect due to network connectivity problem of the user may not result in an alert, but if the device is connected to a network and one or more other application have connectivity, the disconnect of a particular application from its hosted service may result in an alert.

The examples provided in FIGS. 1 through 4 are illustrated with specific systems, services, applications, modules, codes, and notifications. Embodiments are not limited to environments according to these examples. Diagnostic and recovery signals for disconnected applications in hosted service environment may be implemented in environments employing fewer or additional systems, services, applications, engines, codes, and user experience configurations. Furthermore, the example systems, services, applications, modules, and notifications shown in FIG. 1 through 4 may be implemented in a similar manner with other values using the principles described herein.

Figure 5:
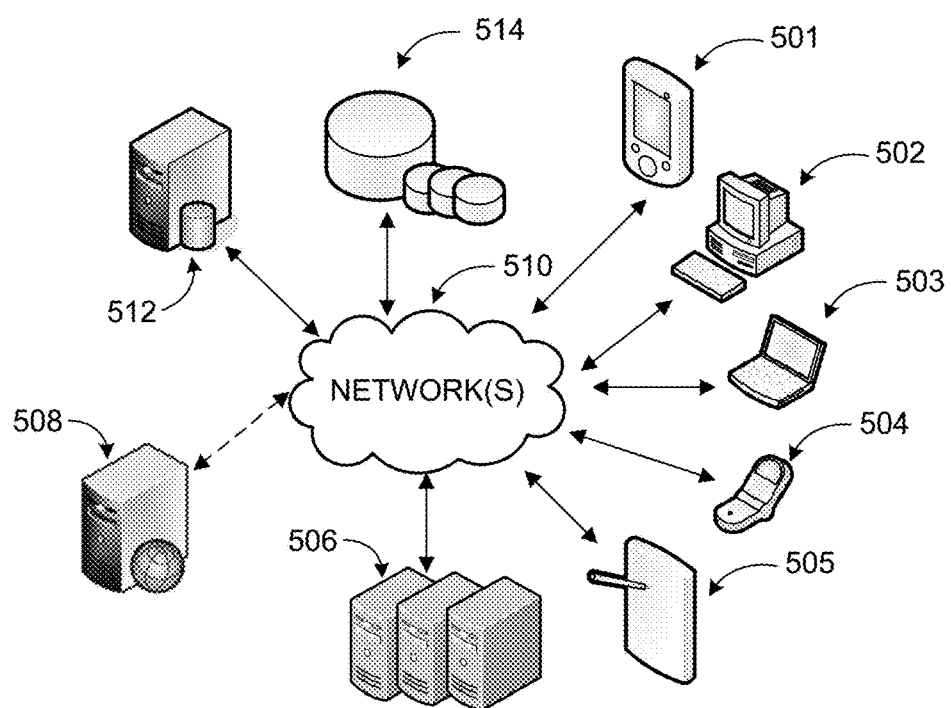
FIG. 5 is a networked environment, where a system according to embodiments may be implemented.

FIG. 5 is a networked environment, where a system according to embodiments may be implemented. In addition to locally installed applications (for example, application 106), providing diagnostic and recovery signals for disconnected applications in hosted service environment may also be employed in conjunction with hosted applications and services (for example, a productivity service 114) that may be implemented via software executed over one or more servers 506, individual server 508, or at client devices, as illustrated in diagram 500. A hosted service or application may communicate with client applications on individual computing devices such as a handheld computer 501, a desktop computer 502, a laptop computer 503, a smart phone 504, a tablet computer (or slate), 505 ('client devices') through network(s) 510 and control a user interface presented to users.

Client devices 501-505 are used to access the functionality provided by the hosted service or application. One or more of the servers 506 or server 508 may be used to provide a variety of services as discussed above. Relevant data such as cloud stored versions of the files may be stored in one or more data stores (e.g. data store 514), which may be managed by any one of the servers 506 or by database server 512.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, engines, data sources, and data distribution systems may be employed for diagnostic and recovery signals for disconnected applications in hosted service environment. Furthermore, the networked environments discussed in FIG. 5 are for illustration purposes only. Embodiments are not limited to the example applications, engines, or processes.

Figure 6:
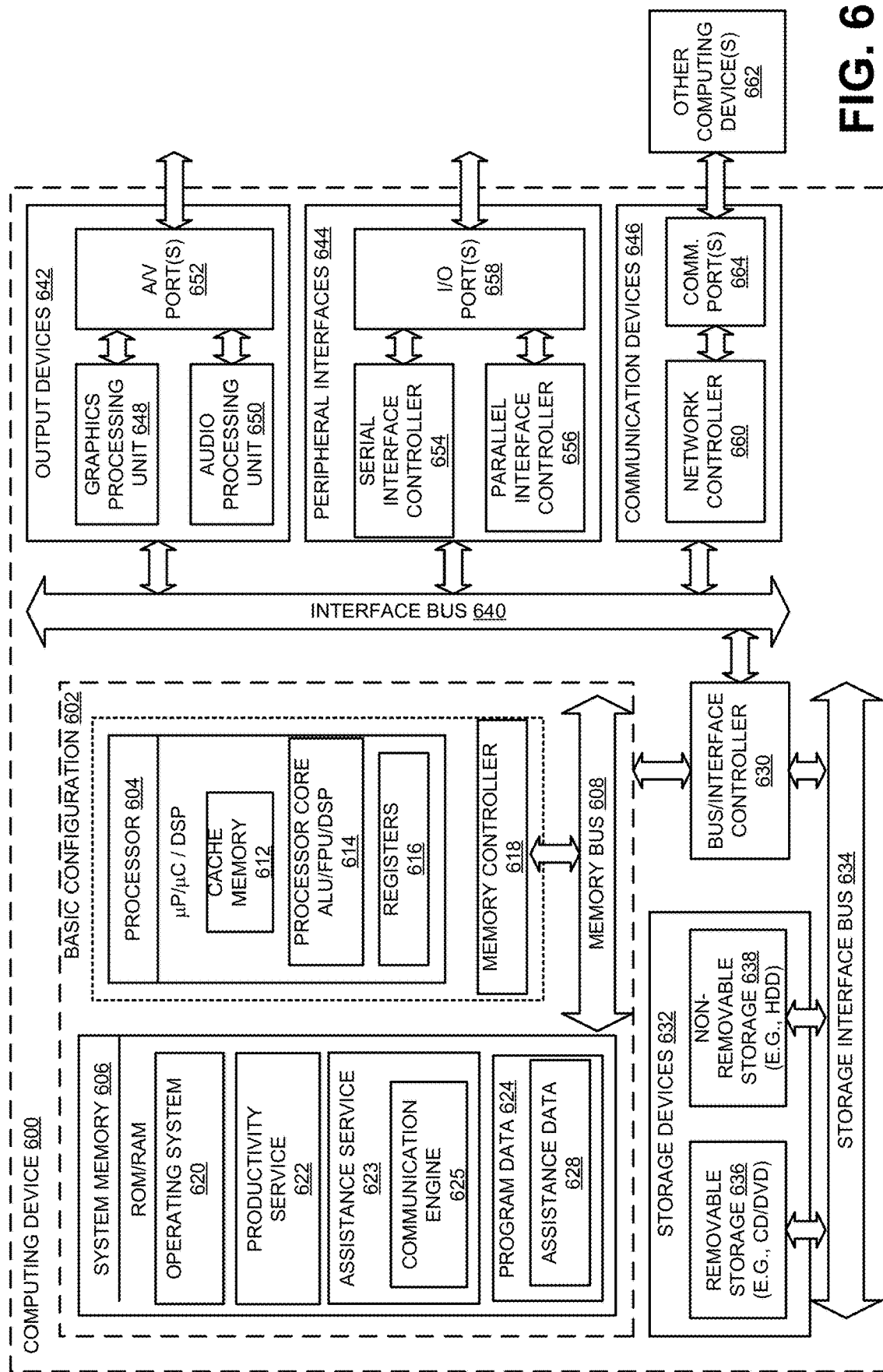
FIG. 6 is a block diagram of an example general purpose computing device, which may be used to provide diagnostic and recovery signals for disconnected applications in hosted service environment.

FIG. 6 is a block diagram of an example general purpose computing device, which may be used to provide diagnostic and recovery signals for disconnected applications in hosted service environment.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a productivity service 622, an assistance service 623, and program data 624. The assistance service 623 may provide diagnostic and recovery signals for disconnected applications in hosted service environment in conjunction with the communication engine 625 for the productivity service 622. The program data 624 may include, among other data, assistance data 628 such as telemetry data, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to provide diagnostic and recovery signals for disconnected applications in hosted service environment. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
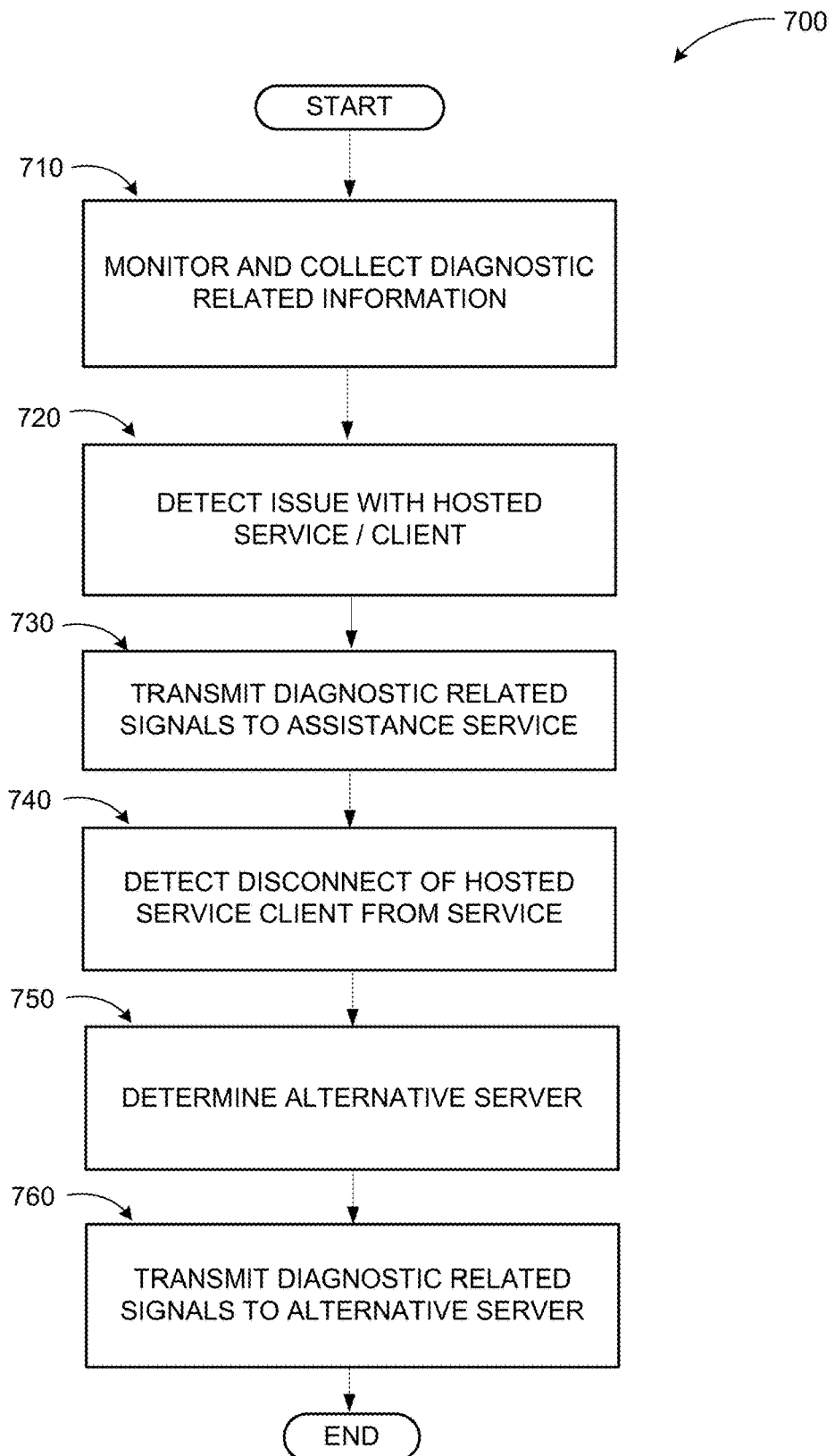
FIG. 7 illustrates a logic flow diagram of a method to provide diagnostic and recovery signals for disconnected applications in hosted service environment.

FIG. 7 illustrates a logic flow diagram of a method to provide diagnostic and recovery signals for disconnected applications in hosted service environment, according to embodiments.

Process 700 may be implemented on a computing device, server, or other system. An example system may include a computer communicatively coupled to a productivity service server.

Process 700 begins with operation 710, where an assistance service or application may monitor and collect client-side operating environment information associated with physical configuration and software parameters of a user's computing device as well as receive similar server-side information associated with the user such as server-side physical configuration, software configuration, operational parameters, and user credentials (e.g., permission levels), etc. from the hosting service of an application (e.g., the productivity service) while performing diagnostic and recovery actions.

At operation 720, the assistance service or application may detect an issue with the application or the hosting service. The issue may also be indicated by a user. At operation 730, the assistance application or the assistance service's local client/agent may transmit diagnostic related signals to the service. Diagnostic related signals may include a description of the issue, some or all of the collected/received information, analysis results, and similar information.

At operation 740, the assistance application or the assistance service's local client/agent may detect a disconnect of the hosted service from the application at the user device. In response, the assistance application or the assistance service's local client/agent may determine an alternative server at operation 750 and transmit the diagnostic related signals including alerts to the alternative server at operation 760.

The operations included in process 700 are for illustration purposes. Providing diagnostic and recovery signals for disconnected applications in hosted service environment may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing diagnostic and recovery signals for disconnected applications in a hosted service environment is described. The means may include a means for detecting a disconnect of an application associated with the hosted service from one or more servers while monitoring and collecting diagnostic related information associated with a user device and one or more servers executing a hosted service; a means for determining an alternative server to transmit diagnostic related signals to; and a means for transmitting the diagnostic related signals to the alternative server, where the alternative server is in a different cluster of servers at a datacenter from the one or more servers.

According to some examples, a method to provide diagnostic and recovery signals for disconnected applications in a hosted service environment is described. The method may include while monitoring and collecting diagnostic related information associated with a user device and one or more servers executing a hosted service, detecting a disconnect of an application associated with the hosted service from one or more servers; determining an alternative server to transmit diagnostic related signals to; and transmitting the diagnostic related signals to the alternative server, where the alternative server is in a different cluster of servers at a datacenter from the one or more servers.

According to other examples, the method may also include employing one or more rules to monitor the diagnostic related signals. The one or more rules may include one or more thresholds to raise an alert. The method may further include raising the alert based on the diagnostic related signals employing the one or more thresholds. The alternative server may have a different scope compared to a scope of the one or more servers. The diagnostic related signals may include one or more of hardware and software environment information associated with the user device and state data associated with the application. The diagnostic related signals may also include one or more of a timing of the disconnect of the application.

According to further examples, the method may also include determining whether a network connectivity of the user device is interrupted and whether one or more other application executed on the user device are disconnected; and transmitting an alert based on the determination. The method may further include providing a notification to the user prior to or while transmitting the diagnostic related signals to the alternative server.

According to other examples, a computing device to provide diagnostic and recovery signals for disconnected applications in a hosted service environment is described. The computing device may include a communication interface configured to facilitate communication between the computing device and one or more servers; a memory configured to store instructions; and one or more processors coupled to the memory, where the one or more processors, in conjunction with the instructions stored in the memory, are configured to execute an assistance service. The assistance service may include one or more assistance agents executed on user device, where each assistance agent may be configured to while monitoring and collecting diagnostic related information associated with a user device and one or more servers executing a hosted service, detect a disconnect of an application associated with the hosted service from one or more servers; determine an alternative server to transmit diagnostic related signals to; employ one or more rules to monitor the diagnostic related signals; and transmit an alert based on the one or more rules and the diagnostic related signals to the alternative server, where the alternative server is in a different cluster of servers at a datacenter from the one or more servers.

According to some examples, each assistance agent may be further configured to detect the disconnect of the application based on a user input, automatically detect the disconnect of the application without a user input, and/or notify the user about the disconnect and activation of diagnosis and recovery operations. The hosted service may be a productivity service and the assistance service may be part of the productivity service. The alternative server may be configured to execute a component of the productivity service. The alternative server may be dedicated to the assistance service.

According to further examples, a physical computer-readable storage medium with instructions stored thereon to provide diagnostic and recovery signals for disconnected applications in a hosted service environment is described. The instructions may include while monitoring and collecting diagnostic related information associated with a user device and one or more servers executing a hosted service, automatically detecting a disconnect of an application associated with the hosted service from one or more servers; employing one or more rules to monitor the diagnostic related signals; raising an alert based on a threshold in the one or more rules; determining an alternative server to transmit diagnostic related signals to; transmitting the alert and the diagnostic related signals to the alternative server, where the alternative server is in a different cluster of servers at a datacenter from the one or more servers and has a different scope compared to a scope of the one or more servers.

According to yet other examples, the instructions may further include transmitting a timing and a circumstance of the disconnect to the alternative server. The diagnostic related signals may include one or more of a memory capacity, a storage capacity, a processor capacity, a network connectivity, an operating system configuration, and state data of one or more applications executed on the user device. The diagnostic related signals may also include one or more of raw collected data, analysis results, and inferences made by an assistance application. The instructions may further include attempting one or more recovery actions at the user device; and including results of the one or more recovery actions in the transmitted diagnostic related signals.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for providing an alert regarding a disconnection of an application associated with a hosted service environment, the computing device comprising:
a processor configured to
detect a disconnect of the application from a server associated with the hosted service environment, the application executed on a user device and configured to access functionality provided via the hosted service environment,
identify a type of event causing the disconnect based on collected diagnostic related information associated with the user device and the application,
determine an alternative server,
selectively determine whether to transmit the alert indicating the disconnect of the application to the alternative server based on the type of event causing the disconnect, wherein a disconnect due to a first type of event does not result in transmission of the alert and a disconnect due to a second type of event results in the transmission of the alert,
transmit the alert and a diagnostic related signal to the alternative server based on the determination.

2. The computing device of claim 1, wherein the application includes a browser application executed on the user device.

3. The computing device of claim 1, wherein the application includes a version of an application executed on the server.

4. The computing device of claim 1, wherein the application, as executed by the processor, performs the selective determination of whether to transmit the alert.

5. The computing device of claim 1, wherein an assistance client, as executed by the processor, performs the selective determination of whether to transmit the alert.

6. The computing device of claim 1, wherein the processor is included in a second server, separate from the server of the hosted service environment.

7. The computing device of claim 1, wherein the alternative server is in a different cluster of servers than the server associated with the hosted service environment.

8. The computing device of claim 1, wherein the alternative server has a different scope compared to a scope of the server.

9. The computing device of claim 1, wherein the collected diagnostic related information includes at least one selected from a group consisting of hardware environment information associated with the user device, software environment information associated with the user device, state data associated with the application, and a timing of the disconnect of the application.

10. The computing device of claim 1, wherein the processor is configured to identify the type of event causing the disconnect by determining whether a network connectivity of the user device is interrupted and whether one or more other applications executed on the user device are disconnected.

11. The computing device of claim 1, wherein the processor is further configured to provide a notification to user prior to transmitting the alert to the alternative server.

12. The computing device of claim 1, wherein the processor is further configured to provide a notification to a user while transmitting the alert to the alternative server.

13. The computing device of claim 1, wherein the processor is further configured to transmit diagnostic related signals, determined based on the collected diagnostic related information, to the alternative server.

14. A method to provide an alert regarding a disconnection of an application associated with a hosted service environment, the method comprising:
   collecting diagnostic related information associated with a user device and the application, the application executed on the user device and configured to access functionality provided via the hosted service environment;
   detecting, with an electronic processor, a disconnect of the application from a server associated with the hosted service environment;
   identifying, with the electronic processor, a type of event causing the disconnect based on the collected diagnostic related information;
   determining, with the electronic processor, an alternative server;
   selectively determining, with the electronic processor, whether to transmit the alert indicating the disconnect of the application to the alternative server based on the type of event causing the disconnect, wherein a disconnect due to a first type of event does not result in transmission of the alert and a disconnect due to a second type of event results in the transmission of the alert; and
   transmitting the alert to the alternative server based on the determination.

15. The method of claim 14, wherein the alternative server is in a different cluster of servers than the server associated with the hosted service environment and has a different scope compared to a scope of the server.

16. The method of claim 14, wherein detecting the disconnect of the application includes detecting the disconnect of the application based on user input.

17. The method of claim 14, wherein detecting the disconnect of the application includes detecting the disconnect of the application automatically.

18. A hardware computer-readable storage medium with instructions stored thereon, the instructions, when executed via a processor, perform a set of functions, the set of functions comprising:
   collecting diagnostic related information associated with a user device and an application, the application executed on the user device and configured to access functionality provided via a hosted service environment;
   detecting a disconnect of the application from a server associated with the hosted service environment;
   identifying a type of event causing the disconnect based on the collected diagnostic related information;
   determining an alternative server;
   selectively determining whether to transmit a diagnostic related signal based on the collected diagnostic related information and an alert indicating the disconnect of the application to the alternative server based on the type of event causing the disconnect, wherein a disconnect due to a first type of event does not result in transmission of the alert and a disconnect due to a second type of event results in the transmission of the alert; and
   transmitting the alert and the diagnostic related signal to the alternative server based on the determination.

19. The hardware computer-readable storage medium of claim 18, wherein the diagnostic related signal includes at least one selected from a group consisting of raw data included in the collected diagnostic related information, an analysis result, and an inference.

20. The hardware computer-readable storage medium of claim 18, wherein the set of functions further comprises:
   attempting one or more recovery actions at the user device; and
   including a result of the one or more recovery actions in the transmitted diagnostic related signal.

* * * * *